June 27, 1961  A. J. HAUCK  2,990,509
MAGNETIC AMPLIFIER CONTROL CIRCUIT
Filed Feb. 6, 1958
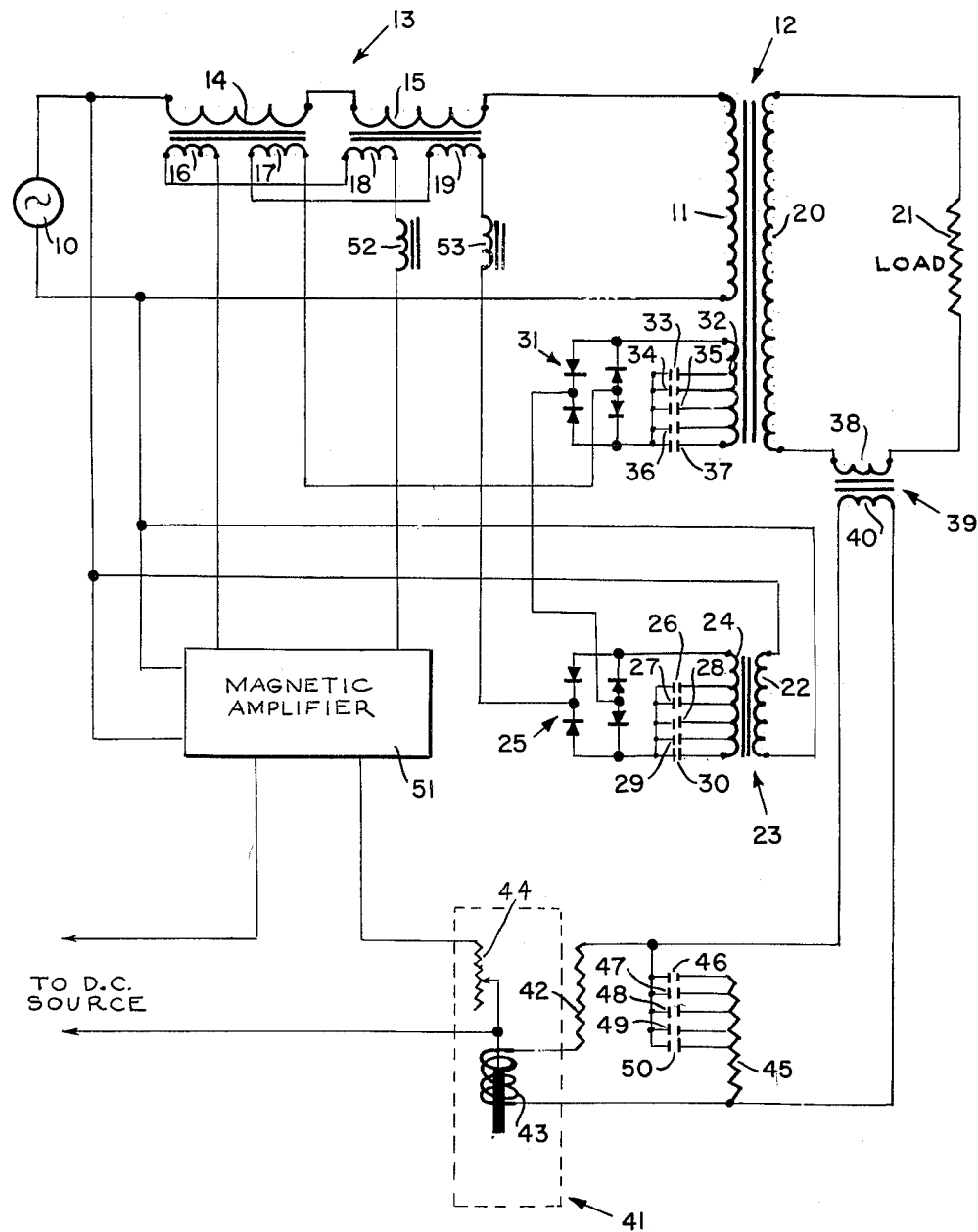
INVENTOR
ALOYSIUS J. HAUCK
BY
Pollard Johnston Smythe & Robertson
ATTORNEYS United States Patent Office 2,990,509
Patented June 27, 1961

2,990,509
MAGNETIC AMPLIFIER CONTROL CIRCUIT
Aloysius J. Hauck, Milwaukee, Wis., assignor, by mesne assignments, to Basic Products Corporation, Milwaukee, Wis., a corporation of Wisconsin
Filed Feb. 6, 1958, Ser. No. 713,655
15 Claims. (Cl. 323—7)

The present invention relates to current regulators, and particularly to a new and improved current regulator in which the load current is held reasonably constant over a wide range of load values.

In prior known current regulators, sensing circuits were employed to measure the load current and provide corrective action to a control winding of a saturable reactor by means of a magnetic amplifier or other equivalent arrangements. Such sensing devices and corrective circuits were capable of compensating for wide ranges of load current and load impedance as well as changes in line voltage. However, the failure of any of these circuits rendered the entire regulator useless.

The principal object of this invention is to provide a current regulator that will maintain the load current reasonably constant over a wide range of load values, which will compensate for line voltage and temperature changes, and which is capable of functioning to provide a source of current for series circuits in the event of failure of the sensing device.

Another object of the invention is to provide such a current regulator in which control windings of a saturable electromagnetic device that supplies the load current are supplied with a direct current that is proportional to load voltage.

Another object of the invention is to provide such a current regulator in which a preset value of direct current may be supplied to the control windings of a saturable reactor to provide a required load current when the load is short circuited, and which D.C. may be aided or bucked by another source of D.C. that is proportional to variations in load impedance.

Another object of this invention is to provide such a current regulator in which a sensing device is employed that is responsive to load current variations and operates to hold the load current constant in spite of supply voltage changes.

Another object of the invention is to provide compensation for load current drop from short circuit conditions due to increase in load.

One aspect of the invention may be to employ a load supply transformer in which its primary is connected across an alternating current supply and which may include a saturable electromagnetic device such as a saturable reactor in series relation therewith. The secondary winding of the load supply transformer may be connected to the load, which may be a lighting circuit or the like. An auxiliary transformer may have its primary connected across the A.C. supply line and its secondary may be connected to a rectifier, the D.C. output of which may be in series with certain of the control windings of the saturable reactor. Presettable relays may be provided in the circuit of this rectifier to produce the required current in the secondary of the supply transformer when the load is short circuited. An auxiliary winding of the supply transformer that sees changes in load may have induced in it a voltage proportional to the load voltage, and it may be connected to another rectifier, the D.C. output of which is in series with the D.C. output of the rectifier connected to the auxiliary transformer. In this way, an open loop feedback system is provided in which the varying current of the rectifier that is supplied by the auxiliary winding of the supply transformer aids or bucks the preset value of current from the rectifier that is supplied from the auxiliary transformer to thereby compensate for any variations of load in the secondary of the supply transformer. Presettable relays may also be included in parallel with the auxiliary winding of the supply transformer so that a balance can be effected to facilitate proper control of the saturable reactor.

With such an arrangement, the current in the load can be held substantially constant in spite of wide variations of load impedance without requiring a sensing device.

In another aspect of the invention, a closed loop feedback system may be provided to compensate for any variations in load current due to variations in supply voltage. This system may comprise the primary of a current transformer that may be connected in series with the load so that its secondary will be responsive to current variations in the load circuit. This proportional current may be fed to a sensing device, the signal from which may be fed to a magnetic amplifier, the D.C. output of which may be fed to other control windings of the saturable reactor.

From the foregoing it is evident that separate controls are provided to maintain substantially constant the load current regardless of fluctuations in the supply voltage and variations in load impedance, so that should the control for the supply voltage fail, the regulator can still provide substantially constant load current over a wide range of load impedance variation.

The above as well as other objects and novel features of the invention will become apparent from the following specification and accompanying drawing, which is merely exemplary.

In the drawing:

The figure is a wiring diagram of the components of a current regulator to which the principles of the invention have been applied.

Referring to the drawing, a source 10 of alternating current supplies power to the primary winding 11 of a load supply transformer 12. A saturable electromagnetic device, which in the embodiment disclosed takes the form of a saturable reactor 13, may be connected in series with the primary winding 11 for the purpose of controlling the load current as will be described later. The saturable reactor 13 may include gate windings 14 and 15, and control windings 16, 17, 18 and 19.

The secondary winding 20 of the transformer 12 may be connected to a variable load 21 which may be an airport lighting circuit or the like. In such lighting systems, it is desirable to maintain the current substantially constant with varying loads in order to obtain reasonable lamp life as well as steady illumination. Accordingly, a primary winding 22 of a transformer 23 is connected across the A.C. supply 10, and the output of the secondary 24 of the transformer 23 is connected across a rectifier 25. A plurality of manually operable contacts 26 to 30, inclusive, may be connected in parallel with successive points along the winding 24 and the one input terminal of rectifier 25. The D.C. output of the rectifier 25 may be connected in series with the control windings 19 and 17 of the saturable reactor 13, as well as in series with another rectifier 31 for a purpose to be described later.

The contacts 26 to 30 may be preset to provide an output D.C. supply from rectifier 25 of such magnitude for the control windings 19 and 17 as to make the current in winding 20 of transformer 12 equal to the required value when the load 21 is short circuited. Normally with such an arrangement, an increase in the load impedance from short circuit to its rated value would cause the load current to drop. In order to maintain proper control of the load current with varying load impedance and to prevent this drop in load current, an open loop feedback system may be employed which may include a winding 32 forming part of transformer 12 and adapted to have induced in it voltages proportional to the variation of load impedance. The winding 32 may be connected across the input terminals of the rectifier 31, and a plurality of manually adjustable contacts 33 to 37 may be connected in parallel with selected points along the winding 32 and the one input terminal of the rectifier 31, so that a balance can be provided for different capacity lighting loads. Accordingly, as the load impedance varies between short circuit and rated value, the voltage induced in winding 32, and consequently the direct voltage supplied by rectifier 31 varies, thus aiding or bucking the preset direct voltage supplied by rectifier 25 to act on the control windings 19 and 17 to thereby maintain substantially constant the load current for a wide variation of load impedance, without requiring the intervention of a sensing device.

The output of transformer winding 32 has a voltage induced in it which is a function of the load impedance. With decreasing load impedance, a reduced supply voltage to transformer 12 is necessary to maintain a constant load current. Therefore, to maintain constant load current, the rectified output of winding 32 is required to control saturable reactor 13 so that decreasing load impedance is accompanied by a reduced voltage applied to winding 11 of transformer 12. Since the load current will be affected by the supply voltage, transformer 23 is provided to sense the supply voltage. The supply voltage signal is required to control saturable reactor 13 so that increasing supply voltage will be accompanied by increased reactance of saturable reactor 13. The two control functions are consolidated by connecting the outputs of rectifiers 25 and 31 in series and connecting the same in series with control windings 17 and 19 of saturable reactor 13. Per superposition, the composite control signal will control reactor 13 to provide the two functions of compensation. Consequently, depending upon the instantaneous conditions of the load impedance and supply voltage, the serially connected rectifier outputs will be adding or subtracting relative to one another to produce the control current.

Not only must the load current be controlled in relation to variations in load impedance, but variations in supply voltage may also be required to be compensated. Accordingly, a closed loop feedback system may be employed that will sense any departure from a preset value of current. This closed loop feedback system may comprise a primary winding 38 of a current transformer 39 connected in series with the load 21, and the secondary winding 40 thereof may supply to a sensing device 41, current proportional to load current. The sensing device 41 may include a resistor 42 to render resistance changes in the solenoid 43 negligible. A resistor 45 in connection with contacts 46 to 50 serves as an adjustable shunt so that the sensing device can be adapted to several output levels.

The signal from the sensing device 41 may be fed to a magnetic amplifier 51 which has its input terminals connected across the supply 10, and its D.C. output may be fed to the control windings 16 and 18 of the saturable reactor 13 to thereby compensate for load current variations due to supply voltage variations.

The magnitude of current through load 21 is sensed by current transformer 39 and a voltage equivalent to a function of the load current is developed across resistor 45. This voltage determines the position of sensing device 41 and that of resistor 44 in order to set the control current to magnetic amplifier 51. Increasing load current results in sensing device 41 controlling magnetic amplifier 51 so that it delivers a reduced drive signal to the control windings 16 and 18 of saturable reactors 14 and 15. The resulting increased reactance of the reactor will decrease the voltage applied to winding 20 of the load circuit and consequently the load current. With a normal supply voltage, tap switches 47 through 50 are adjusted to select the voltage applied to sensing device 41 which will be accompanied by the required current in the load circuit.

Inductors 52 and 53 may be included in the circuits for the control windings 16, 17, 18 and 19 of the saturable reactor 13 to provide approximate sine wave load current characteristics at maximum load current, and to limit the transient load current rise when the impedance of the load is suddenly reduced. However, such inductors are not essential for the proper operation of the compensating circuits.

It is evident that a reduction in the load impedance must be accompanied by a reduced voltage applied to the load in order to maintain constant current. The voltage across winding 32, being a function of load impedance, control the saturable reactor 20 that a reduced voltage is applied to the load. Increasing supply voltage will increase the load current with a constant load impedance. Transformer 22 senses the supply voltage and controls saturable reactor 13 so that the voltage across the load is maintained constant for this case. In the embodiment the control signals from rectifiers 25 and 31 are serially connected to form a composite control signal for reactor 13. Current transformer and resistor 45 provide a means of selecting a reference load current. With sensing device adjusted, a predetermined load current is existent with a normal supply voltage. Variations in supply voltage will effect a change in the load current. Increasing load current develops an increased signal across resistor 45 which results in sensing device 41 changing the D.C. control signal to magnetic amplifier. A decreasing drive signal will be coupled to reactor 13 by magnetic amplifier 51 to cause a reduction in the voltage applied across the load.

From the foregoing it is evident that a control has been provided for maintaining the load current substantially constant over wide ranges of load impedance variations which control is dependent of another control that compensates for supply voltage variations. Accordingly, any failure in the sensing device 41 and its circuitry will not prevent the regulator from supplying substantially constant load current over wide ranges of load impedance variations.

Although the various features of the new and improved current regulator have been shown and described in detail to fully disclose one embodiment of the invention, it will be evident that numerous changes may be made in such details, and certain features may be used without others without departing from the principles of the invention.

Resistor 44 adjusted by the solenoid is not mentioned in the text.

What is claimed is:

1. In a system for compensating for variations in an alternating current supply system with respect to a power distribution load circuit, the combination including a load circuit; a source of alternating current and a saturable electromagnetic device having at least load and control windings acting on a common core for feeding said load circuit; means responsive to voltage variations of said load circuit for acting on a control winding of said saturable electromagnetic device, the response of said saturable electromagnetic device to said means responsive to voltage variations of said load maintaining the load current substantially constant for wide variations of load impedance; signal means connected to said load circuit for producing a signal proportional to load current; means for comparing and amplifying deviations of said signal from a predetermined value to produce an indication signal; and means for causing said indication signal to act on control windings of said saturable electromagnetic device, the response of said saturable electromagnetic device to said indication signal compensating for variations in supply voltage.

2. In a system for compensating for variations in an alternating current supply system with respect to a power distribution load circuit, the combination including a load circuit; a source of alternating current and a saturable electromagnetic device having at least load and control windings acting on a common core for feeding said load circuit; signal means connected to said load circuit for producing a signal proportional to load current; means for comparing and amplifying deviations of said signal from a predetermined value to produce an indication signal for acting on control windings of said saturable electromagnetic device; and means independent of said comparing and amplifying means and responsive to load impedance variations for acting on other control windings of said saturable electromagnetic device.

3. In a system for compensating for variations in an alternating current supply system with respect to a power distribution load circuit, the combination including a load circuit; a source of alternating current and a saturable electromagnetic device; means connected to said load circuit for automatically compensating for line voltage variations; and feedback means independent of said automatic compensating means responsive to load impedance variations for acting on said saturable electromagnetic device.

4. In a system for compensating for variations in an alternating current supply system with respect to a power distribution load circuit, the combination including a load circuit; a source of alternating current and a saturable electromagnetic device, said saturable electromagnetic device being connected in circuit with said load circuit and said source of alternating current to control the flow of current through said load circuit; means connected to said load circuit for automatically compensating for line voltage variations; presettable transformer means responsive to load impedance variations, said transformer means being connected to rectification means, the output of the latter of which acts on control windings of said saturable electromagnetic device.

5. In a system for compensating for variations in an alternating current supply system with respect to a power distribution load circuit, the combination including a load circuit; a source of alternating current and a saturable electromagnetic device said saturable electromagnetic device being connected in circuit with said load circuit and said source of alternating current to control the flow of current through said load circuit; means connected to said load circuit for automatically compensating for line voltage variations; a presettable source of current supplied from line voltage and adapted to provide the required current when said load circuit is short circuited; and another source of current for aiding or bucking the current responsive to load impedance variations and adapted to aid or buck said required current proportionally to variations in load impedance.

6. In a system for compensating for variations in an alternating current supply system with respect to a power distribution load circuit, the combination including a load circuit; a source of alternating current and a saturable reactor for feeding said load circuit; means connected to said load circuit for automatically compensating for line voltage variations; and open loop feedback means independent of said automatic compensating means responsive to load impedance variations for acting on control windings of said saturable reactor.

7. In a system for compensating for variations in an alternating current supply system with respect to a power distribution load circuit, the combination including a load circuit; a source of alternating current and a saturable reactor for feeding said load circuit; means connected to said load circuit for automatically compensating for line voltage variations; presettable transformer means responsive to load impedance variations, said transformer means being connected to rectification means, the output of the latter of which acts on the control windings of said saturable reactor.

8. In a system for compensating for variations in an alternating current supply system with respect to a power distribution load circuit, the combination including a load circuit; a source of alternating current and a saturable reactor for feeding said load circuit; means connected to said load circuit for automatically compensating for line voltage variations; a presettable transformer means supplied from line voltage; another presettable transformer means responsive to load impedance variations; and rectification means connected to the output of each of said presettable transformer means, the output of each said rectification means being serially connected to combine the rectified signals, said serially connected outputs of said rectification means being serially connected to control windings of said saturable reactor and being operative to control said saturable reactor.

9. In a system for compensating for variations in an alternating current supply system with respect to a power distribution load circuit, the combination including a load circuit; a source of alternating current and a saturable reactor for controlling the flow of current through said load circuit; means connected to said load circuit being operative to control said saturable reactor for automatically compensating for line voltage variations; a source of current supplied from line voltage; means being operative to additionally control said saturable reactor for presetting said line supplied source of current to cause current to flow in said load circuit equal to the required value when said load is short circuited; another source of current; and means for causing said other source of current to aid or buck said line supplied source of current in response to variations in load impedance.

10. In a system for compensating for variations in an alternating current supply system with respect to a power distribution load circuit, the combination including a load circuit; a source of alternating current and a saturable reactor for feeding said load circuit; signal means connected to said load circuit for producing a signal proportional to load current; a closed loop feedback system for comparing and amplifying deviations of said signal from a predetermined value to produce an indication signal for acting on control windings of said saturable reactor for automatically compensating for line voltage variations; and open loop feedback means independent of said automatic compensating means responsive to load impedance variations for acting on other control windings of said saturable reactor.

11. In a system for compensating for variations in an alternating current supply system with respect to a power distribution load circuit, the combination including a load circuit; a source of alternating current and a saturable reactor for feeding said load circuit; signal means connected to said load circuit for producing a signal proportional to load current; means for comparing and amplifying deviations of said signal from a predetermined value to produce an indication signal for acting on control windings of said saturable reactor for automatically compensating for line voltage variations; presettable transformer means responsive to load impedance variations, said transformer means being connected to rectification means, the output of the latter of which acts on other control windings of said saturable reactor.

12. In a system for compensating for variations in an alternating current supply system, a source of alternating current; a saturable reactor in series with said source of alternating current and including multiple control windings; a load circuit; a variable presettable source of direct current connected to said saturable reactor to obtain a predetermined current in said load circuit when the latter is short circuited; and a second source of direct current adapted to aid or buck said variable presettable source of direct current, said second source of direct current being responsive by the impedance of said load circuit, whereby said load current is prevented from varying with variations in the impedance of said load circuit.

13. In a system for compensating for variations in a load circuit, the combination including load circuit means; a source of alternating current; saturable electromagnetic means connected to said load circuit to control the flow of current from said alternating current source through said load circuit; and load impedance reflecting means connected to said system so as to see changes in load, and connected to said saturable electromagnetic means for providing a predetermined current in the load circuit when the load is in short circuit condition, and for compensating for current drop due to increase in load.

14. In a system for compensating for variations in a load circuit, the combination including load circuit means; a source of alternating current; saturable electromagnetic means connected to said load circuit to control the flow of current from said alternating current source through said load circuit; a reference source of direct current; and load impedance reflecting means connected to said system so as to see changes in load, and for producing a second source of direct current, said sources of direct current being connected to said saturable electromagnetic means for providing a predetermined current in the load circuit when the load is in short circuit condition, and for compensating for current drop due to increase in load.

15. In a system for compensating for variations in a load circuit, the combination including load circuit means; a source of alternating current; saturable electromagnetic means connected to said load circuit to control the flow of current from said alternating current source through said load circuit; a reference source of direct current; and load impedance reflecting means connected to said system so as to see changes in load, and for producing a second source of direct current, said sources of direct current being combined and connected to said saturable electromagnetic means for providing a predetermined current in the load circuit when the load is in short circuit condition, and for compensating for current drop due to increase in load.

References Cited in the file of this patent

UNITED STATES PATENTS

| | | |
|---|---|---|
| 2,786,968 | Kabak | Mar. 26, 1957 |
| 2,830,256 | Bale | Apr. 8, 1958 |
| 2,832,032 | Walker et al. | Apr. 22, 1958 |